United States Patent
Bird et al.

(10) Patent No.: US 11,715,006 B2
(45) Date of Patent: Aug. 1, 2023

(54) NATURAL LANGUAGE CODE SEARCH

(71) Applicant: MICROSOFT TECHNOLOGY LICENSING, LLC., Redmond, WA (US)

(72) Inventors: Christian Alma Bird, Redmond, WA (US); Shengyu Fu, Redmond, WA (US); Zhongyan Guan, Redmond, WA (US); Neelakantan Sundaresan, Bellevue, WA (US); Mark Alistair Wilson-Thomas, Mercer Island, WA (US); Shuo Zhang, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 489 days.

(21) Appl. No.: 16/835,308

(22) Filed: Mar. 31, 2020

(65) Prior Publication Data

US 2021/0303989 A1  Sep. 30, 2021

(51) Int. Cl.
*G06F 16/00* (2019.01)
*G06N 3/08* (2023.01)
*G06F 16/95* (2019.01)
*G06F 16/33* (2019.01)

(52) U.S. Cl.
CPC .......... *G06N 3/08* (2013.01); *G06F 16/3344* (2019.01); *G06F 16/95* (2019.01)

(58) Field of Classification Search
CPC ....... G06N 3/08; G06F 16/3344; G06F 16/95; G06F 8/36
See application file for complete search history.

(56) References Cited

U.S. PATENT DOCUMENTS

| | | | |
|---|---|---|---|
| 2007/0168946 A1* | 7/2007 | Drissi | G06F 8/36 717/110 |
| 2016/0210353 A1* | 7/2016 | Holmes | G10L 15/08 |
| 2016/0357519 A1* | 12/2016 | Vargas | G06F 3/0488 |

OTHER PUBLICATIONS

Abad, et al., "Two Sides of the Same Coin: Software Developers' Perceptions of Task Switching and Task Interruption", In The Proceedings of 22nd International Conference on Evaluation and Assessment in Software Engineering, Jun. 28, 2018, pp. 175-180.
Amann, et al., "A Study of Visual Studio Usage in Practice", In The Proceedings of IEEE 23rd International Conference on Software Analysis, Evolution, and Reengineering (SANER), Mar. 14, 2016, pp. 124-134.
Singer, et al., "An Examination of Software Engineering Work Practices", In Proceedings of the Conference of the Centre for Advanced Studies on Collaborative Research, Nov. 1997, 15 Pages.
"International Search Report and Written Opinion Issued in PCT Application No. PCT/US21/013257", dated Apr. 14, 2021, 28 Pages.

* cited by examiner

*Primary Examiner* — Tyler J Torgrimson

(57) ABSTRACT

A natural language code search service provides idioms or frequently-occurring code patterns for a code fragment based on similar type usage and method/API invocation usage. The search service uses a data mining technique that mines code snippets found from various websites and code snippets generated from a neural model to detect idioms in the code snippets that were previously unknown and which can be reused. A search is initiated through a natural language query within a code development tool or application thereby avoiding the need to switch out of the current application to perform the search.

20 Claims, 15 Drawing Sheets

NATURAL LANGUAGE CODE SEARCH

BACKGROUND

Software developers often utilize different sources to assist in the development of a program. Often a developer (e.g., user, client, customer, etc.) may search for source code snippets to understand the usage of a program construct of a programming language (e.g., method, API, expression, statement) and to find existing source code that can be reused. The developer may spend a considerable amount of time in reviewing online documentation, forums, source code repositories, and/or discussion boards to find the solution for an intended task. Although, there are many software development tools available to assist a software developer to develop source code, often these tools do not provide enough capabilities for a developer to complete a programming task without switching in and out of the software development tool to search for additional information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A natural language code search service provides code snippets containing idioms or frequently-occurring code patterns for a code fragment for a natural language query based on similar type usage and method/API invocation usage. The search service mines code snippets found from various websites and augments them with code snippets generated from a neural model and/or a frequent subtree mining model to retrieve lists of frequently-occurring code snippets which were previously unknown and which is reused for code development.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Aspects of the present invention pertain to a natural language source code search service that provides idioms, or frequently-used source code patterns, from a large and varied corpus of source code. The service uses a data mining technique that mines code snippets found from various websites and code snippets generated from a neural model to detect idioms in the code snippets that were previously unknown. The quality of the code snippets found from a search engine is unknown. These code snippets may be pseudo-code, partially-completed code and contain errors. The code snippets generated from the neural model are based on a source code repository having a higher-quality source code, typically having been compiled and successfully executed. The combination of the two mining datasets improves the quality of the idioms that are detected by the data mining technique.

In one aspect, the natural language source code search service provides idioms for source code methods under development that have similar type usage and contain similar method/API invocations. The service receives requests for the idioms in a natural language thereby having widespread applicability to any application capable of interacting with a web service.

Attention now turns to a further discussion of the system, devices, components, and methods of the natural language source code search.

System

Figure 1:
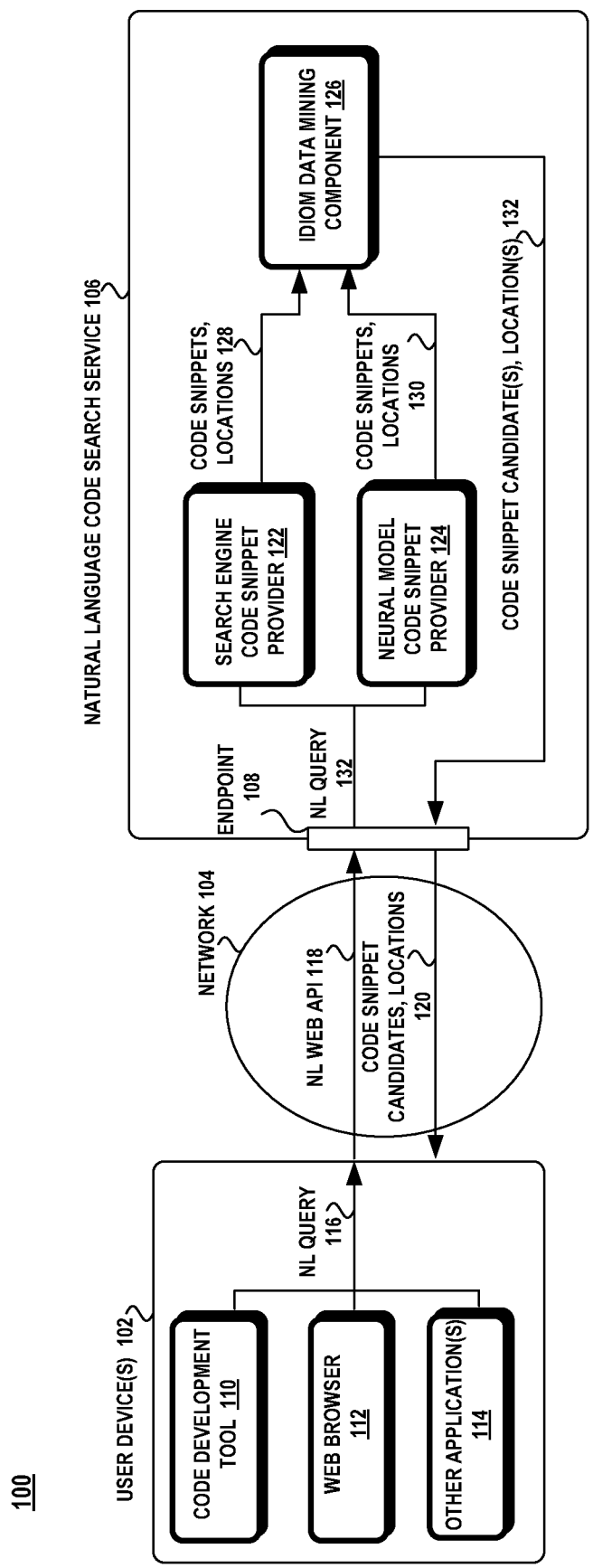
FIG. 1 illustrates an exemplary configuration of natural language code search service.

FIG. 1 illustrates a block diagram of an exemplary system 100 in which various aspects of the invention may be practiced. A user device 102 is communicatively coupled via a network 104 to a natural language code search service 106. The natural language code search service 106 includes one or more cloud servers (not shown). A cloud server may be part of a datacenter that provides distributed computing services. The datacenter can be configured to communicate with local computing devices used by cloud consumers including personal computers, mobile devices, embedded systems, or other computing devices. Within the data center, computing devices can be configured as servers, either as standalone devices or individual blades in a rack of one or more other server devices.

The natural language code search service 106 is an on-demand web-based service that uses API (Application Programming Interface) interfaces to facilitate communications with the user devices 102. A request or query is made to an endpoint 108 of the natural language code search service 106 through a web API. An endpoint 108 is a network port that is referenced by a uniform resource locator (URL) to receive messages destined to the web service 106 to transmit responses to the messages. There may be multiple endpoints for the web service 106 where each endpoint is used to receive different types of messages.

The user device 102 may contain various applications, such as a code development tool 110 (e.g., source code editor, integrated development environment (IDE)), a web browser 112 and other applications 114 that request services from the natural language code search service 106. The request is formed using the natural language (NL) of the developer, NL query 116. The request 116 is transformed into a NL web API 118 that is transmitted to the endpoint 108 of the web service 106. The web service 106 responds with a response 120 that includes one or more source code snippets and their respective location.

The natural language code search service 106 may include a search engine code snippet provider 122, a neural model code snippet provider 124, and an idiom data mining component 126. The search engine code snippet provider 122 generates pairs of code snippets and locations (e.g., URL) 128 discovered from a search engine. The neural model code snippet provider 124 generates pairs of code snippets and their corresponding locations 130 inferred from source code extracted from source code repositories. The pairs of code snippets and locations 128, 130 are input into an idiom data mining component 126 to uncover frequently-used code patterns based on similar type usage and method invocations.

It should be noted that the term "method" is to include an Application Programing Interface (API), a function, and a procedure. A type is a data attribute that indicates the intended use of data. The term "type" is based on the type system of a programming language. For example, in a strongly-typed programming language, such as C#, the type system includes value types and reference types. A value type has its own copy of the data and a reference type stores a reference to the data. Value types in C# include simple types, enum types, struct types, and nullable value types. Reference types in C# include class types, interface types, array types and delegate types. A class type defines a data structure that contains data members, such as fields, and function members, such as methods and properties. In one aspect of the disclosure, a "type" pertains to an object-oriented class. "Type usage" refers to the manner in which a class is utilized, such as creating objects of a class, calling methods from a class, and interacting with other classes. However, it should be noted that the disclosure is not limited to just class-based types and may be applied to any other code constructs or combinations thereof.

Figure 2:
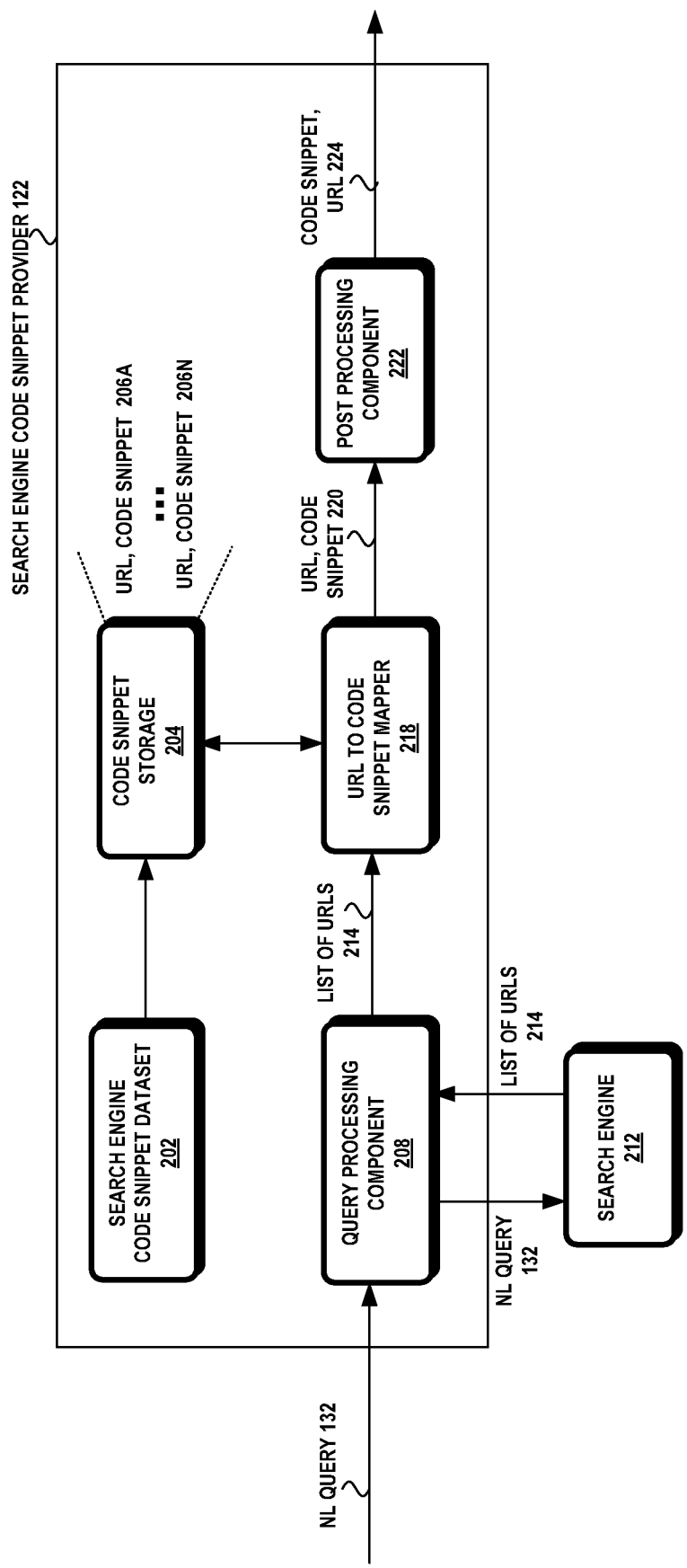
FIG. 2 is an exemplary configuration of a search engine code snippet provider.

FIG. 2 illustrates an exemplary configuration of the search engine code snippet provider 122. The search engine code snippet provider 122 contains a code snippet storage 204 having pairs of code snippets and URLs 206A-206N. The code snippet storage 204 is loaded with code snippets from a search engine code snippet dataset 202. The search engine code snippet dataset 202 is obtained from searches performed by one or more search engines (e.g., Bing, Google, Yahoo, Baidu, DuckDuckGo, Ask.com, AOL.com, etc.). The code snippets obtained from the searches and their corresponding web locations, URLs, are loaded into the code snippet storage 204.

The search engine code snippet provider 122 receives an NL query 132 which is processed by a query processing component 208. The query processing component 208 utilizes a search engine 212 to provide a list of URLs 214 satisfying the query. The list of URLs 214 is then used by the URL-to-code snippet mapper 218 to obtain matching source code snippets from the code snippet storage 204. The post processing component 222 receives the pairs of source code snippets and URLs 220 and removes duplicates in order to generate a unique set of paired URLs and code snippets 224.

Figure 3:
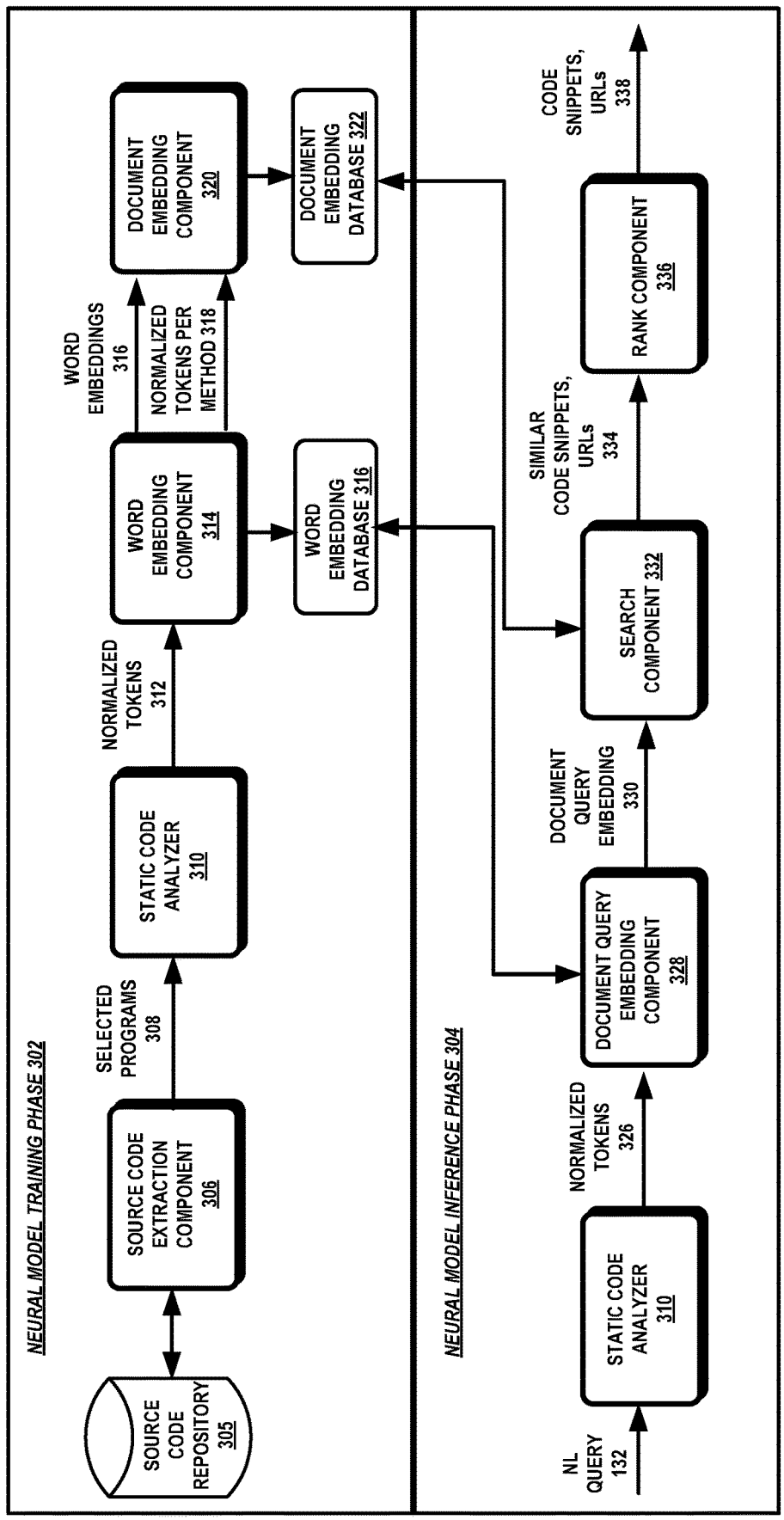
FIG. 3 is an exemplary configuration of a neural model code snippet provider.
Figure 4:
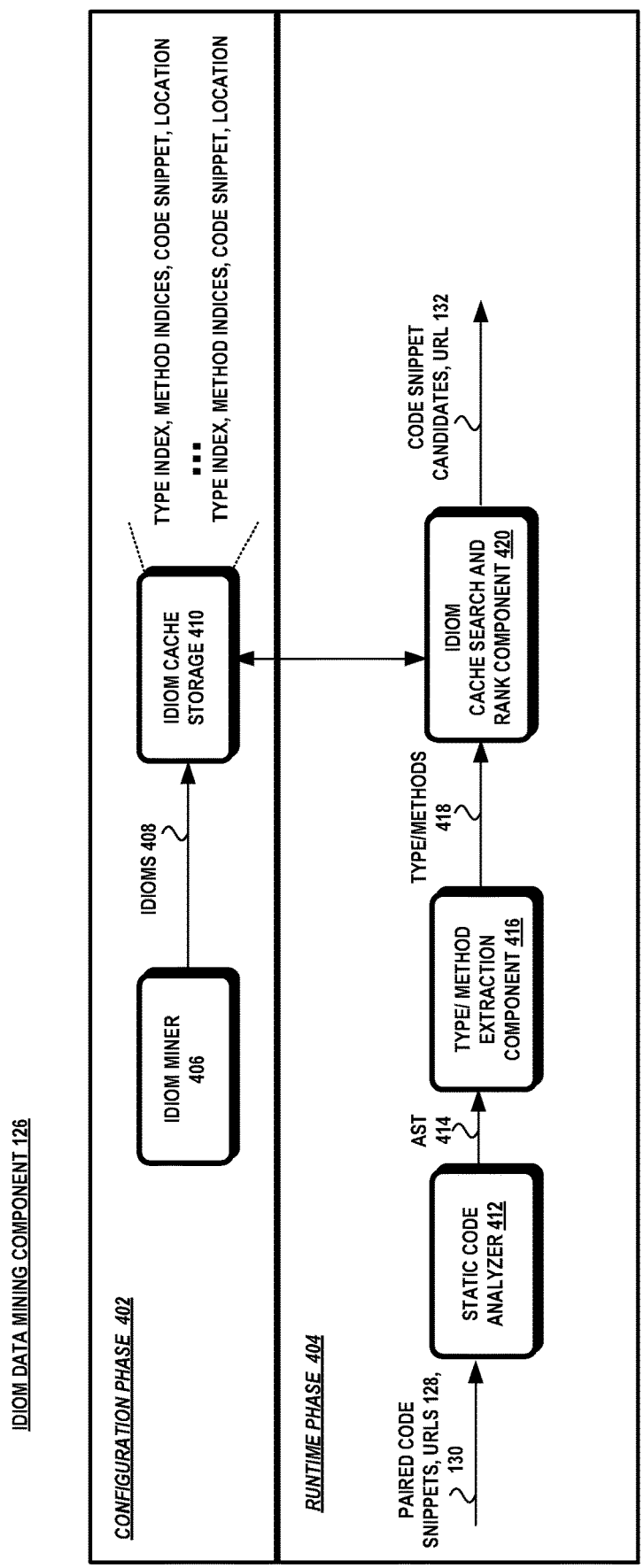
FIG. 4 is an exemplary configuration of an idiom data mining component.

FIG. 3 illustrates an exemplary configuration of the training phase 302 and inference phase 304 of a neural model code snippet provider 124. In the training phase 302, word embeddings are generated for each token in the training dataset of the neural model and document embeddings are generated for the list of tokens in each method in the training dataset. In the inference phase 304, the NL query 132 is converted into a respective document embedding, referred to as a document query embedding 330, by the document query embedding component 328. The document query embedding component 328 uses the pre-trained word embeddings from the word embedding database 316 to generate a document query embedding 330. The search component 332 finds similar document embeddings from the document embedding database 322 as the document query embedding 330 and outputs the corresponding code snippets and URLs 334. The rank component 336 ranks the resulting pairs of code snippets and URLs 338 in a ranked order based on how close the found code snippets are to the NL query. Those code snippets that are close are ranked higher and the top-ranked code snippets within a threshold number are selected FIG. 4 is a more detailed illustration of the components of the idiom data mining component 126. The idiom data mining component 126 includes an idiom cache storage 410 which is loaded with idioms 408 previously mined by an idiom miner 406 in an offline configuration phase 402. The idiom cache storage 410 includes the code snippets of the mined idioms which are indexed by a unique identifier composed of types and methods. In addition, the idiom cache storage 410 contains a location associated with each code snippet indicating sufficient provenance information to recreate the source of the code snippet.

In the runtime phase 404, the idiom data mining component 126 receives pairs of code snippets and URLs 128, 130 from the search engine code snippet provider 122 and the neural model code snippet provider 124. Each code snippet is parsed by a static code analyzer (e.g., parser, front-end compiler, regular expression token parser, etc.) 412 into an abstract syntax tree 414. The type/method extraction component 416 extracts the types and methods invoked from the AST and the idiom cache search and rank component 420 uses these types and methods to search for matching code snippets from the idiom cache storage 410. The matching code snippets and their respective locations 132 are returned to the application having made the NL query.

Methods

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5:
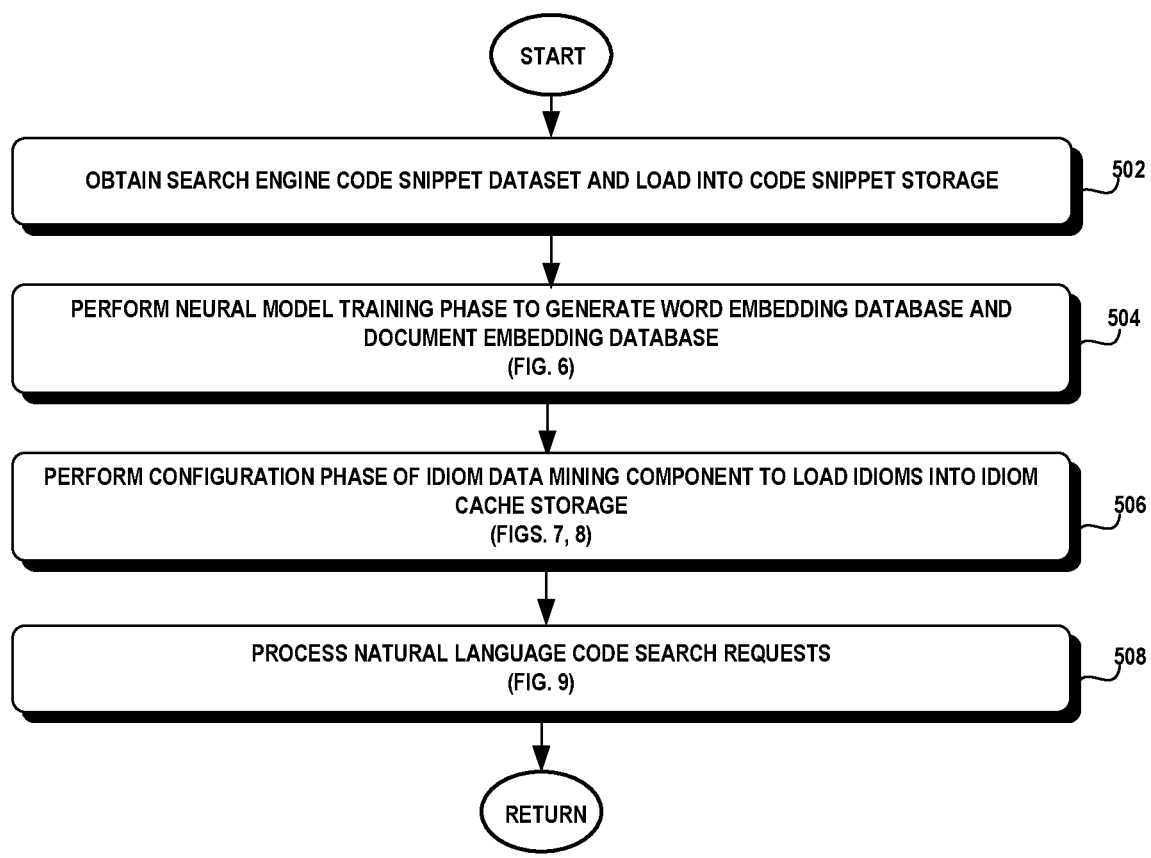
FIG. 5 is a flow diagram illustrating an exemplary method for configuring the natural language code search service.

FIG. 5 illustrates an exemplary offline configuration process of the natural language code search service. Referring to FIGS. 2-5, a dataset of search engine code snippets 202 is obtained and loaded into the code snippet storage 204 of the search engine code snippet provider 122 (block 502). The search engine code snippets 202 may be generated by querying a search engine (e.g., Bing, Google, Yahoo, Baidu) for code snippets, filtering out all other extra data from the search result, and keeping the code snippet and its URL (block 502).

The neural model training phase 302 operates to generate the word embedding database 316 and the document embedding database 322 (block 504). The configuration phase 402 of the idiom data mining component 126 performs data mining on source code repositories and loads the idioms into the idiom cache storage (block 506). Upon completion of these configuration phases, the natural language code search service processes the incoming natural language search requests (block 508).

Figure 6:
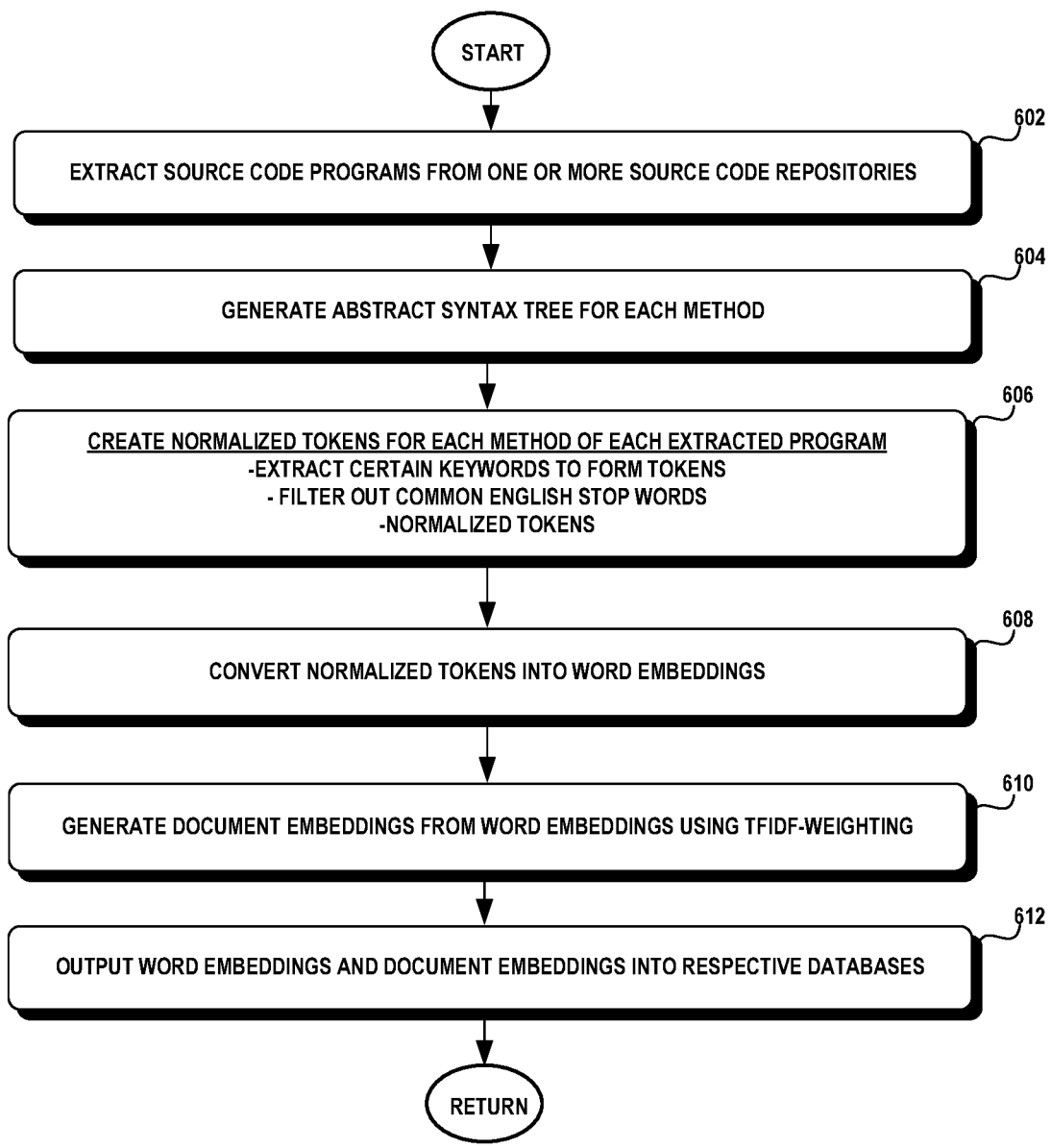
FIG. 6 is a flow diagram illustrating an exemplary method for generating word and document embeddings for the neural model.

Attention now turns to a more detailed discussion of the process of generating word and document embeddings. Turning to FIGS. 3 and 6, one or more source code repositories 305 are searched for source code programs written in a target programming language 308. The source code repository 305 may be a file archive and web hosting facility that stores large amounts of source code either privately or publicly. The source code repository 305 can be structured as a version control system, such as GIT, Mercurial, etc. The source code programs residing in the source code repository 305 vary and may be written in different programming languages. (Collectively, block 602).

The source code extraction component 306 obtains several selected source code programs 308 which may be written in the same or different programming languages. A programming language utilizes a context-free grammar that is a set of rules that describe all possible strings in a formal programming language. The selected source code programs 308 can come from different domains, such as without limitation, scientific computing, web development, dataflow programming, machine learning, and the like. (Collectively, block 602).

The selected source code programs 308 are then processed by a static code analyzer (e.g., parser, front end compiler) 310 to parse each method into an abstract syntax tree. An AST is a tree that represents the abstract syntactic structure of a language construct in the grammar of the programming language of the program, where each interior node and the root node represent an operator and the children of the root and interior nodes represent the operands of that operator. (Collectively, block 604).

In addition, the static code analyzer 310 extracts certain keywords from each method. In one aspect, the keywords include method names, method invocations, enums, string literals, and comments. The method name includes the class name containing the method. An enum is a user-defined type consisting of a set of named constants referred to as enumerators. These keywords are filtered to remove non-alphanumeric characters, strings longer than a threshold number of characters, to split up lower-case and upper-case words into separate tokens, and to remove common English stop words. (Collectively, block 606).

The remaining list of tokens are then normalized. Normalization is the process of canonicalizing tokens that have superficial differences in the character sequence of the token and which are considered as part of the same equivalence class. For example, the terms "Windows", "windows", and "window" are tokens that are considered equivalent. (Collectively, block 606).

Each normalized token represents a word in the vocabulary of the neural model. The corpus size may be 30,000 words. Each normalized token is converted into a respective word embedding. A word embedding is a learned representation for text-based tokens where words that have a common meaning have a common representation. Each normalized token is converted into a respective word embedding. In one aspect, FastText is used to generate the word embeddings. FastText uses neural networks to produce a single vector of floating-point numbers for each normalized token. (Collectively, block 608).

The word embeddings are used to generate a document embedding for each method. The document embedding uses a weighted average of all unique words in the document. The weighted average is based on Term Frequency-Inverse Document Frequency (TF-IDF) which is a function that assigns a weight for each word in a document based on the frequency the word appears in the document. A word has a higher weight if it is used often but if the word is used too frequently, the weight applies a penalty to the word embedding. (Collectively, block 610).

The document embeddings can be represented mathematically as follows:

$$v_d = u(\Sigma_{w \in d} u(v_w) * \text{TFIDF}(w,d,C)),$$

v represents a single vector, d is the set of words representing a document or method, w is the word embedding for a word, C is the set of all the methods in the document embeddings, u is a normalized function where $$u(v) = \frac{v}{|v|},$$

$$TFIDF(w, d, C) = \frac{1 + \log tf(w, d)}{\log \frac{|C|}{df(w, C)}}.$$

The word embeddings and the document embeddings are then stored in a respective database for use in the operation of the natural language code search service (block 612).

Figure 7:
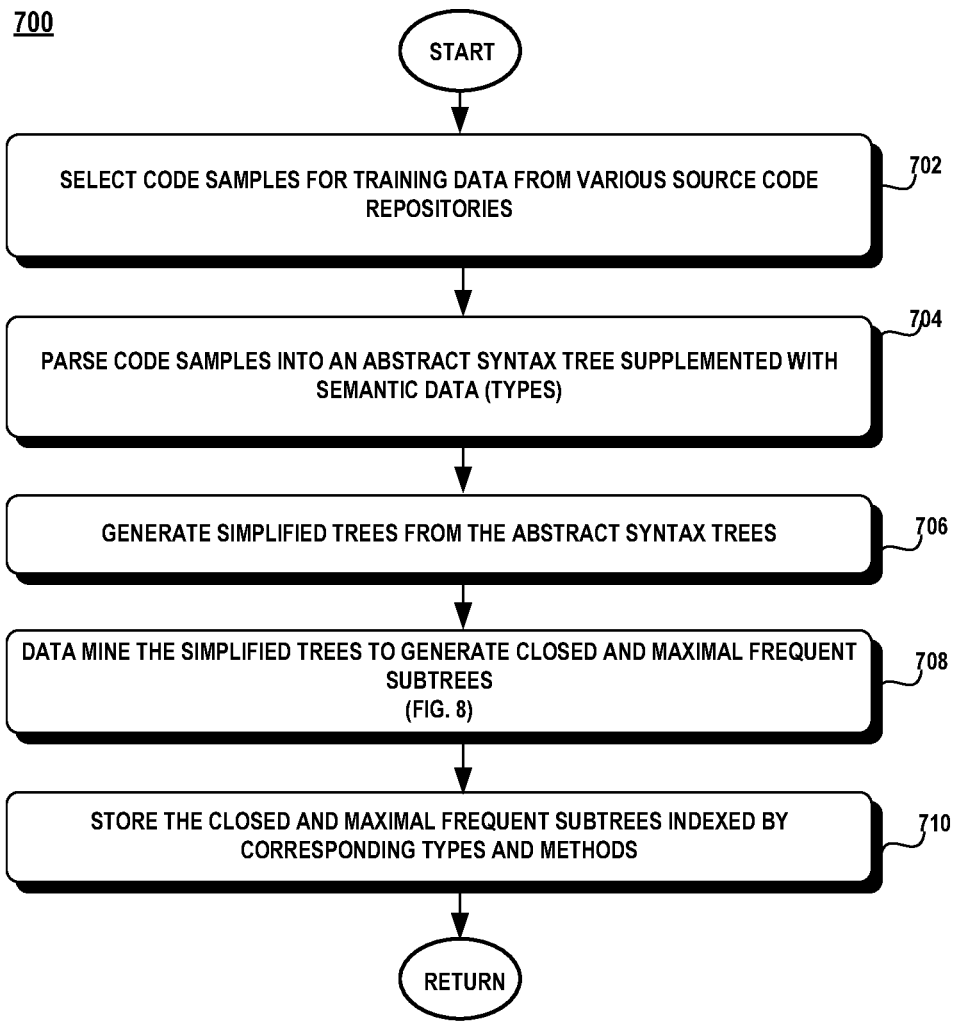
FIG. 7 is a flow diagram illustrating an exemplary method of the idiom data mining component.

Attention now turns to a more detailed description of the idiom data miner. FIG. 7 illustrates one method for mining idioms. However, it should be understood that the disclosure is not limited to this particular mining technique and that other techniques may be used.

Turning to FIGS. 4 and 7, the idiom miner 406 detects patterns of source code methods or idioms from methods having a similar type usage and method invocations. In one aspect, the idiom miner 406 may obtain pre-configured idioms from a web service. In another aspect, as shown in FIG. 7, the idiom miner 406 generates idioms based on programs found in source code repositories using closed and maximal frequent subtree data mining.

The idiom miner 406 obtains source code programs from one or more source code repositories (block 702). Each method in a source code program is parsed into an abstract syntax tree (AST) and augmented with the semantic data (e.g., type data) of each code construct (block 704). Each AST is trimmed into a simplified tree which is a more abstract representation of the AST (block 706). An AST is a sparse and compact representation of a parse tree. Data mining an AST is more difficult due to the sparsity of the data in the AST. Each AST is mined to generate closed and maximal frequent subtrees that represent the idioms (block 708). The subtrees are stored in the idiom cache storage 410 (block 710).

Figure 8:
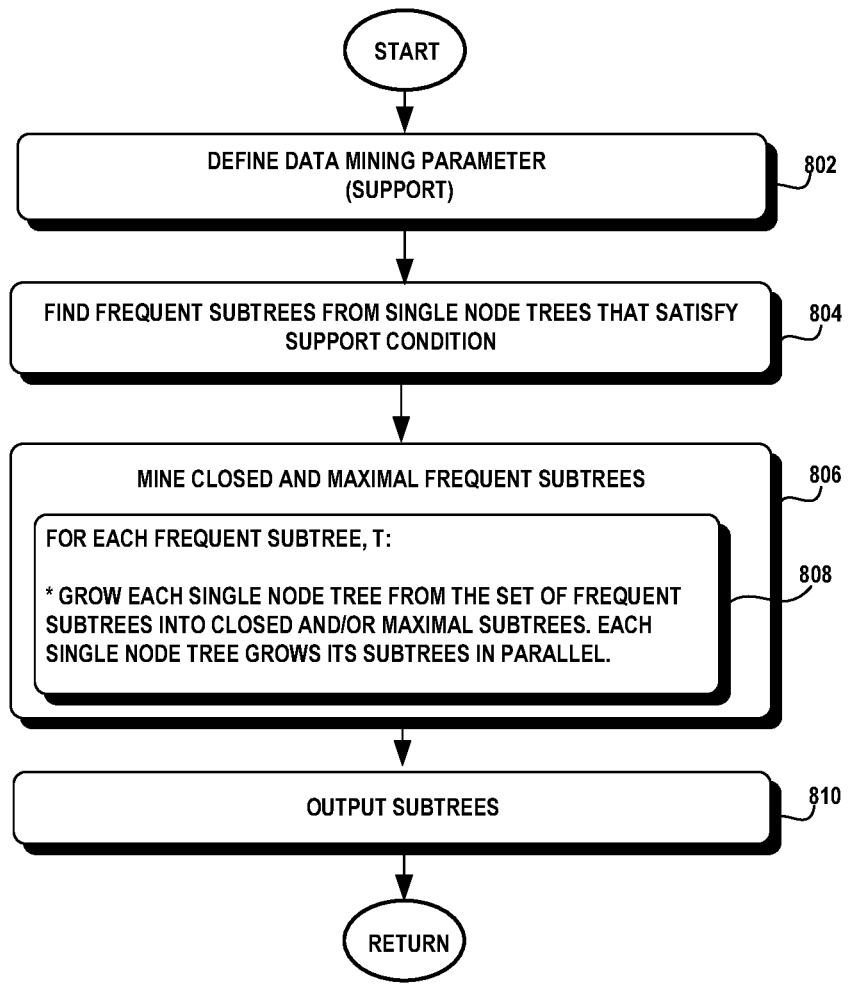
FIG. 8 is a flow diagram illustrating an exemplary method for mining closed and maximal subtrees.

Attention now turns to FIG. 8 which is a more detailed description of the idiom miner. In one aspect, the idiom miner 406 searches for closed and maximal frequent subtrees across a set of simplified trees, T. A maximal frequent subtree is a frequent subtree that is not part of any other frequent subtree. Given a set of simplified trees, referred to as the training data set of trees, the support of a simplified tree, T, is defined as a fraction of the trees in T in which T occurs. A simplified tree, T, is frequent if its support is at least a user-specified threshold. A frequent subtree t is maximal if none of its supertrees are frequent. Support refers to the frequency of a subtree amongst all the trees in the set of simplified trees. A frequent subtree is closed when none of its supertrees has the same support.

The idiom miner 406 obtains the data mining parameters, such as the user-specified support threshold (block 802). The idiom miner 406 then determines the frequent subtrees by finding the single-node trees of the simplified trees that satisfy the support threshold (block 804). A single-node tree is a root or interior node of a simplified tree.

From the set of frequent subtrees, the idiom miner 406 expands those frequent subtrees until the closure condition and/or maximal condition is met (block 806). For each frequent subtree, the frequent subtree is expanded or grown into a number of possible subtrees (block 808). Each of the possible subtrees is grown independently and in parallel with all the other subtrees by adding one node at a time until the subtree satisfies the closure and/or maximal condition (block 808). The frequent subtrees having satisfied the closure and/or maximal condition are then output as the idiom subtrees (block 810). These subtrees are later used to generated code snippets through a traversal of the subtree.

Figure 9:
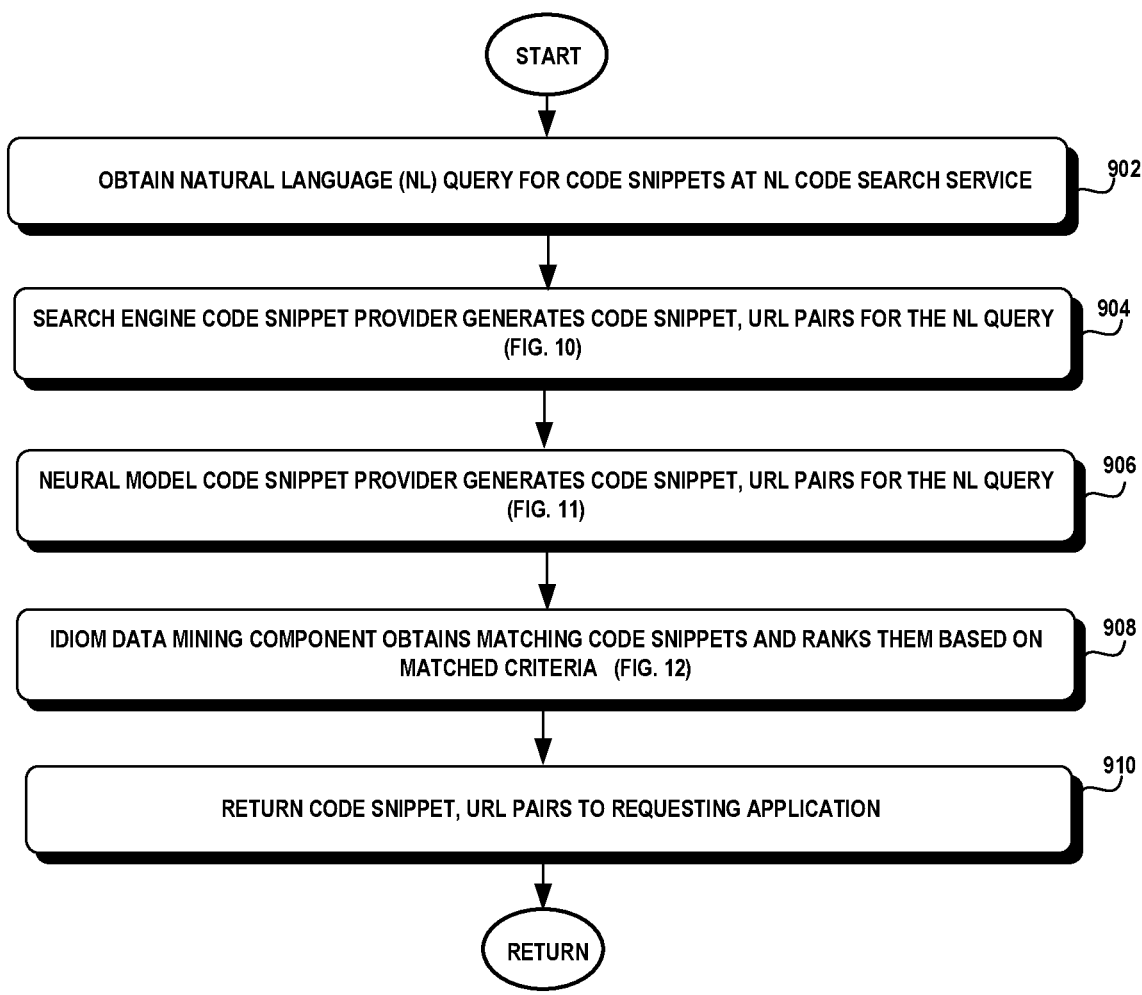
FIG. 9 is a flow diagram illustrating an exemplary method of the natural language code search service.

Attention now turns to a more detailed description of the operation of the natural language code search service. Turning to FIGS. 1 and 9, the natural language code search service 106 obtains a natural language query 132 requesting a code snippet (block 902). The request may be received through a NL web API 118 which is decoded at an endpoint 108 into NL query 132. The NL query 132 is processed by the search engine code snippet provider 122 (block 904) and the neural model provider 124 (block 906) which both generate pairs of code snippets and URLs for the NL query 132. The idiom mining component 126 receives the pairs of code snippets and URLs and provides matching data mined pairs of code snippets and URLs (block 908). The match is made on the usage of the combination of similar types and/or methods and does not have to match perfectly. The natural language code search service 106 transforms the matched subtrees into pairs of code snippets and URLs which are ranked. The top-ranked pairs of code snippets and URLs are returned to the requesting application (block 910).

Figure 10:
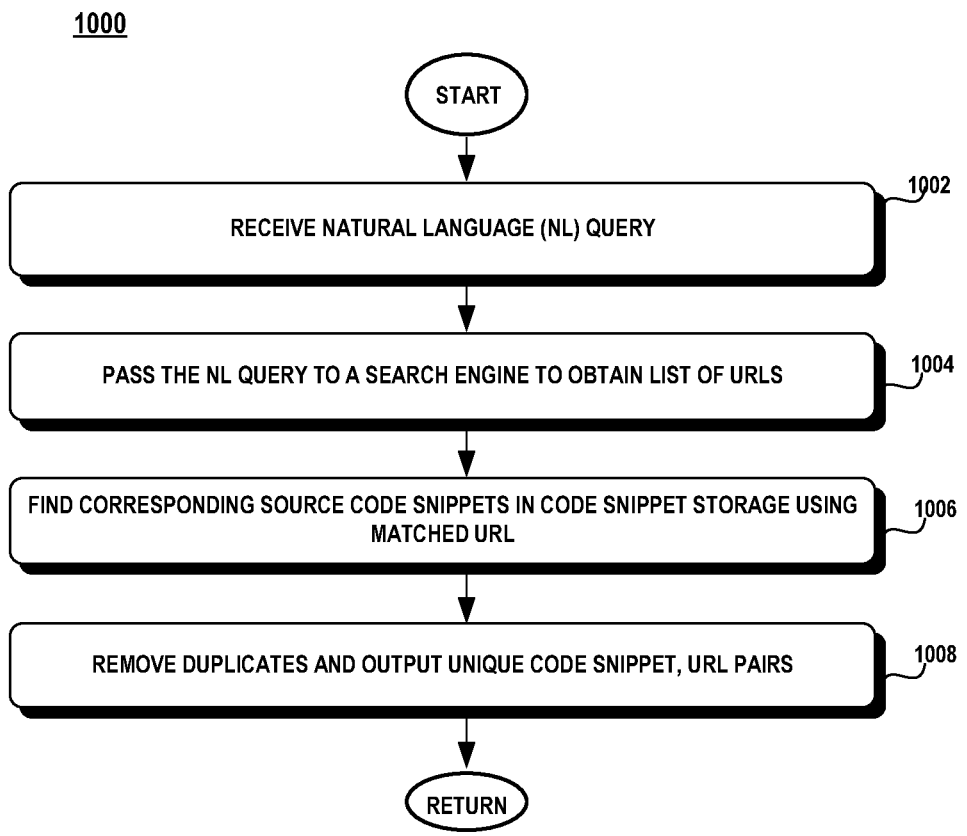
FIG. 10 is a flow diagram illustrating an exemplary method of the search engine code snippet provider.

Attention now turns to a more detailed description of the operation of the search engine code snippet provider. Turning to FIGS. 2 and 10, the search engine code snippet provider 122 receives a NL query 132 (block 1002). The query processing component 208 passes the NL query 132 to a search engine 212. The search engine 212 returns a list of URLs satisfying the NL query 132 (block 1004). The query processing component 208 receives the list of URLs 216 and passes them to the URL-to-code snippet mapper 218. The URL-to-code snippet mapper 218 searches the code snippet storage matching on the URL to obtain pairs of code snippets and URLs 220 (block 1006). The post processing component 222 scans the pairs of code snippets and URLs to eliminate duplicates (block 1008) and outputs the paired code snippets/URLs to the idiom data mining component 126 (block 1010).

Figure 11:
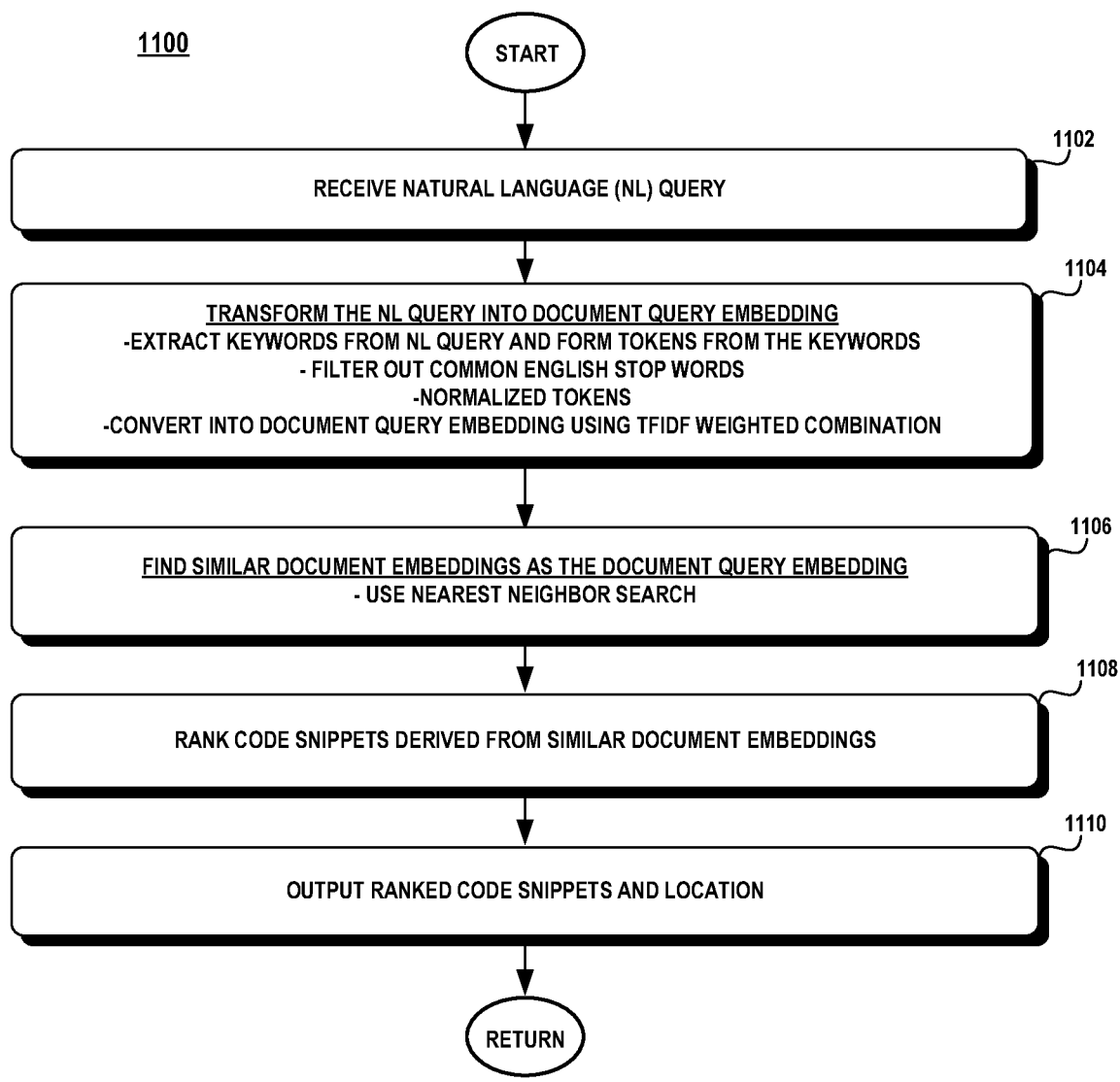
FIG. 11 is a flow diagram illustrating an exemplary method of the neural model code snippet provider.

Attention now turns to a more detailed description of the operation of the neural model provider. Turning to FIGS. 3 and 11, the neural model code snippet provider 124 receives the NL query 132 (block 1102). The NL query 132 is converted into a document query embedding (block 1104). The static code analyzer 310 parses each code snippet into an AST, extracts keywords from the AST to form tokens, filters out common English stop words and produces normalized tokens in a same manner as described in FIG. 6 (block 1104). The document query embedding component 328 uses the word embedding database 316 to generate word embeddings for the normalized tokens 326 and then to generate a document query embedding 330 for the code snippet as described above.

The search component 332 searches the document embedding database 322 to find similar code snippets 334 as the document query embedding 330. An approximate nearest neighbor search is used to determine the most similar document embedding based on cosine similarity. (Collectively, block 1106).

The rank component 336 ranks the similar code snippets so that the more similar code snippets are returned as code snippet candidates (block 1108). The ranking uses rules that prioritize a document embedding matching a threshold number of tokens in the query and the length of the code snippets (block 1108). A threshold number of the ranked code snippets is output and transmitted to the idiom data mining component (block 1110).

Figure 12:
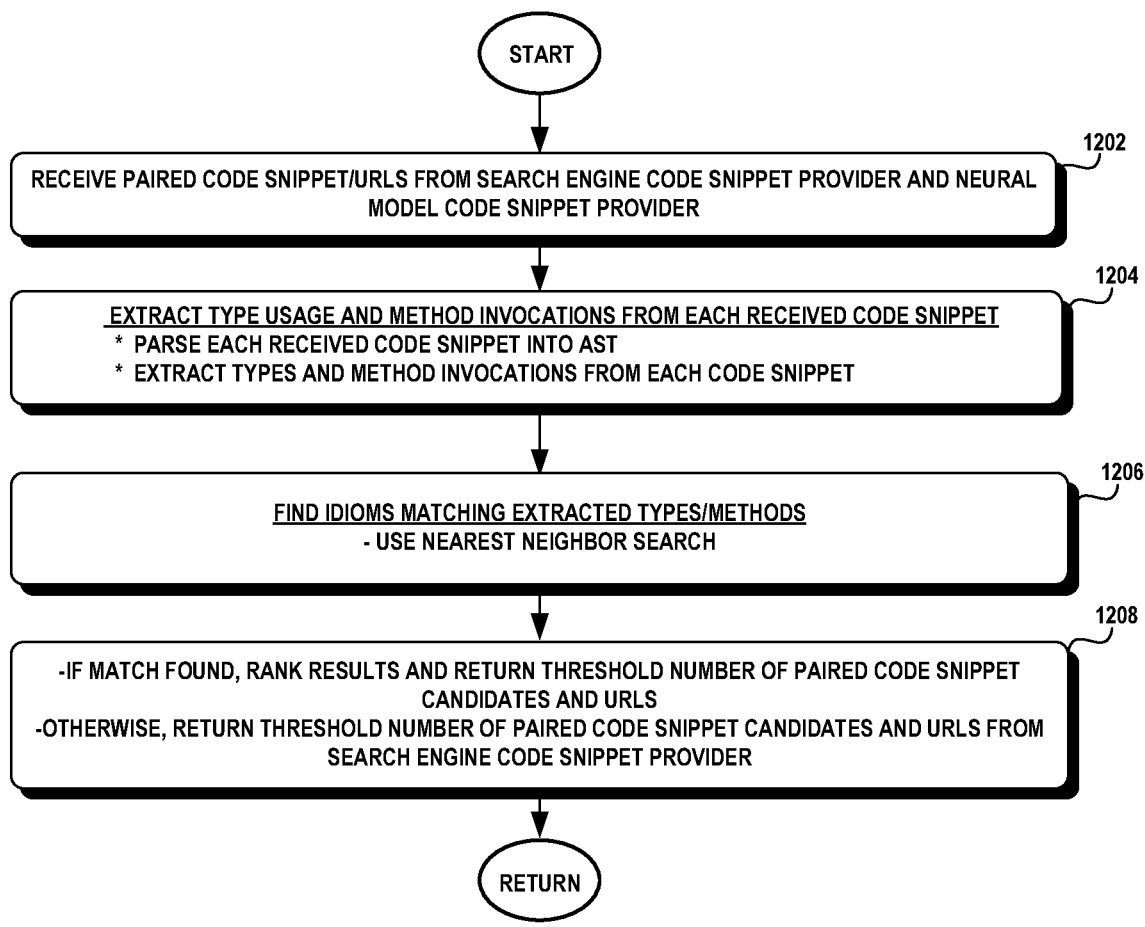
FIG. 12 is a flow diagram illustrating an exemplary method of the idiom data mining component.

Attention now turns to a more detailed description of the runtime processing of the idiom data mining component. Turning to FIGS. 4 and 12, the idiom data mining component 126 receives pairs of code snippets and URLs from the search engine code snippet provider and the neural mode code snippet provider (block 1202). These code snippets are parsed into respective ASTs by a static code analyzer 412 (block 1204). The type/method extraction component extracts the types used in the code snippet and the method invocations from the AST (block 1206). The types and methods extracted 418 are used by the idiom cache search and rank component 420 to search the idiom cache storage 410 for matching code snippets (block 1208). A match is made by matching the extracted type and extracted methods with the indices of the idiom cache storage 410 (block 1208).

If a match is found, then the idiom cache search and rank component 420 ranks the code snippets based on how well the extracted type and extracted methods match the code snippets found from the idiom cache storage 410. A match may be made on any combination of types and/or methods. For example, the idiom cache storage 410 may have a code snippet that only matches the extracted type but not the extracted methods. Other code snippets may match an extracted method but not the extracted type and yet others may match both the extracted type and methods. The code snippets are ranked by how precisely they match the extracted types and methods. Those that match precisely are ranked higher. Alternatively, the ranking may be based on a ranking of the types. Certain types may be given a higher priority than others. A code snippet matching on a type having a higher priority is ranked higher than a code snippet matching on a type having a lower priority. The top ranked candidates within a threshold number are returned. The ranked code snippets and their corresponding URLs are then returned as code snippet candidates in the ranked order. Otherwise when no match is found in the idiom cache storage, the search query result 224 from the search engine code snippet provider 122 is returned as the code snippet candidate (Collectively, block 1208).

Figure 13:
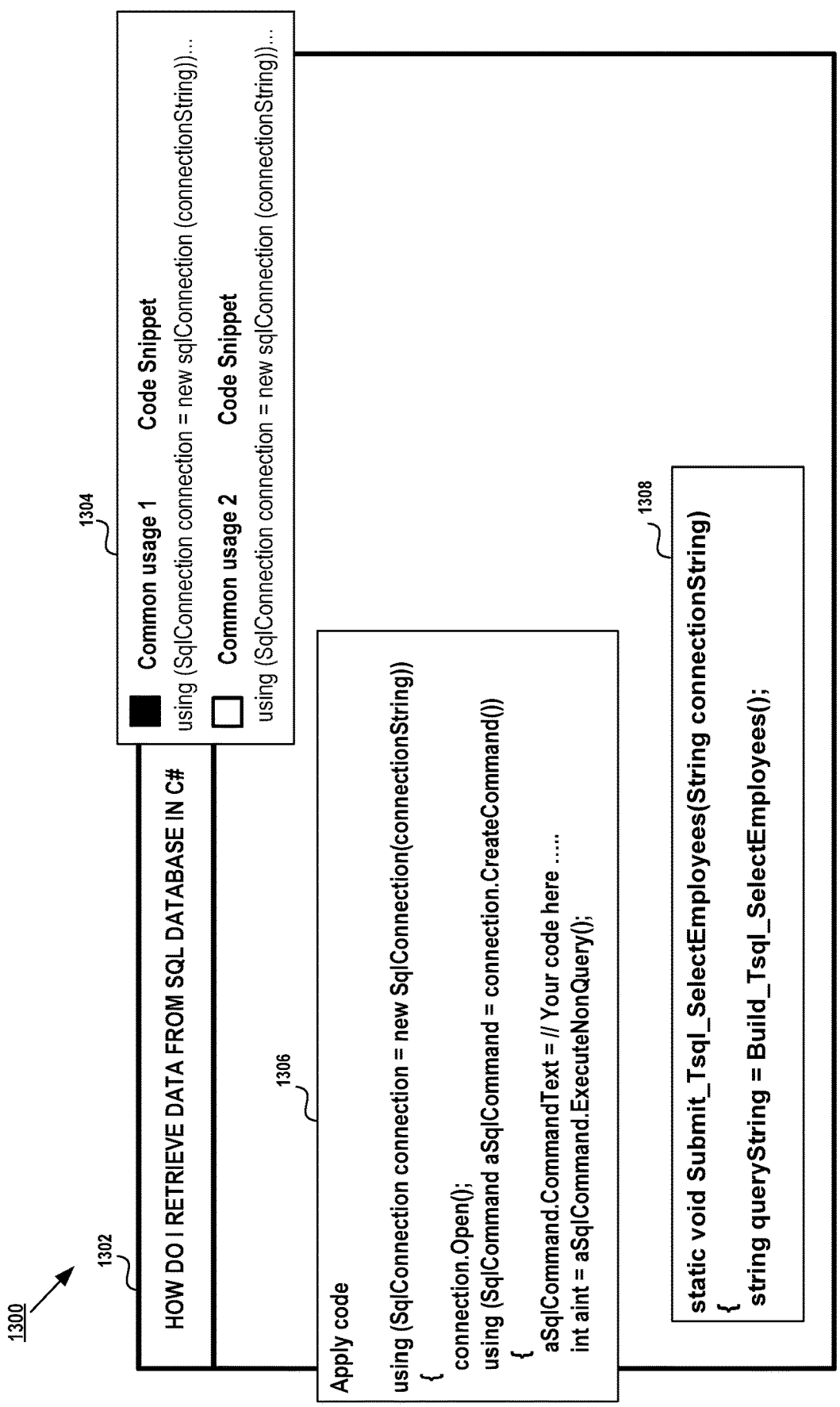
FIG. 13 is an exemplary illustration of a code development tool utilizing the natural language code search service.

Attention now turns to an exemplary code development environment that utilizes the natural language code search service. Turning to FIG. 13, there is shown a user interface 1300 of a software development environment or tool, such as a source code editor and/or integrated development environment (IDE) having a natural language search bar 1302. The user interface 1300 includes a set of features or functions for writing and editing a source code program. The user interface 1300 contains several lines of source code in C# pertaining to SQL functions 1308. A developer may utilize the search bar 1302 to enter a query to retrieve source code pertaining to the retrieval of data from a SQL database. As shown in FIG. 13, the query is "How Do I Retrieve Data From SQL Database in C#." The query is submitted to the natural language code search service through a natural language web API and a list of code snippet candidates 1304 is returned to the user interface.

The user interface 1300 may utilize a pop-up window to present the list of code snippet candidates 1304 in response to the query entered into the search bar 1302. A developer may browse through the code snippet candidates 1304 and select one from the list, such as common usage 1 shown in pop up window 1306. The developer may select this source code which is then added into the existing code 1308 automatically.

Attention now turns to an exemplary configuration of the natural language code search system applied for custom source code 1500. Custom source code is source code specific to a particular project, enterprise, developer or entity that uses types and classes that are private, not widely known or publicly-accessible. The custom types and classes may be contained in private third-party libraries or databases.

Figure 15:
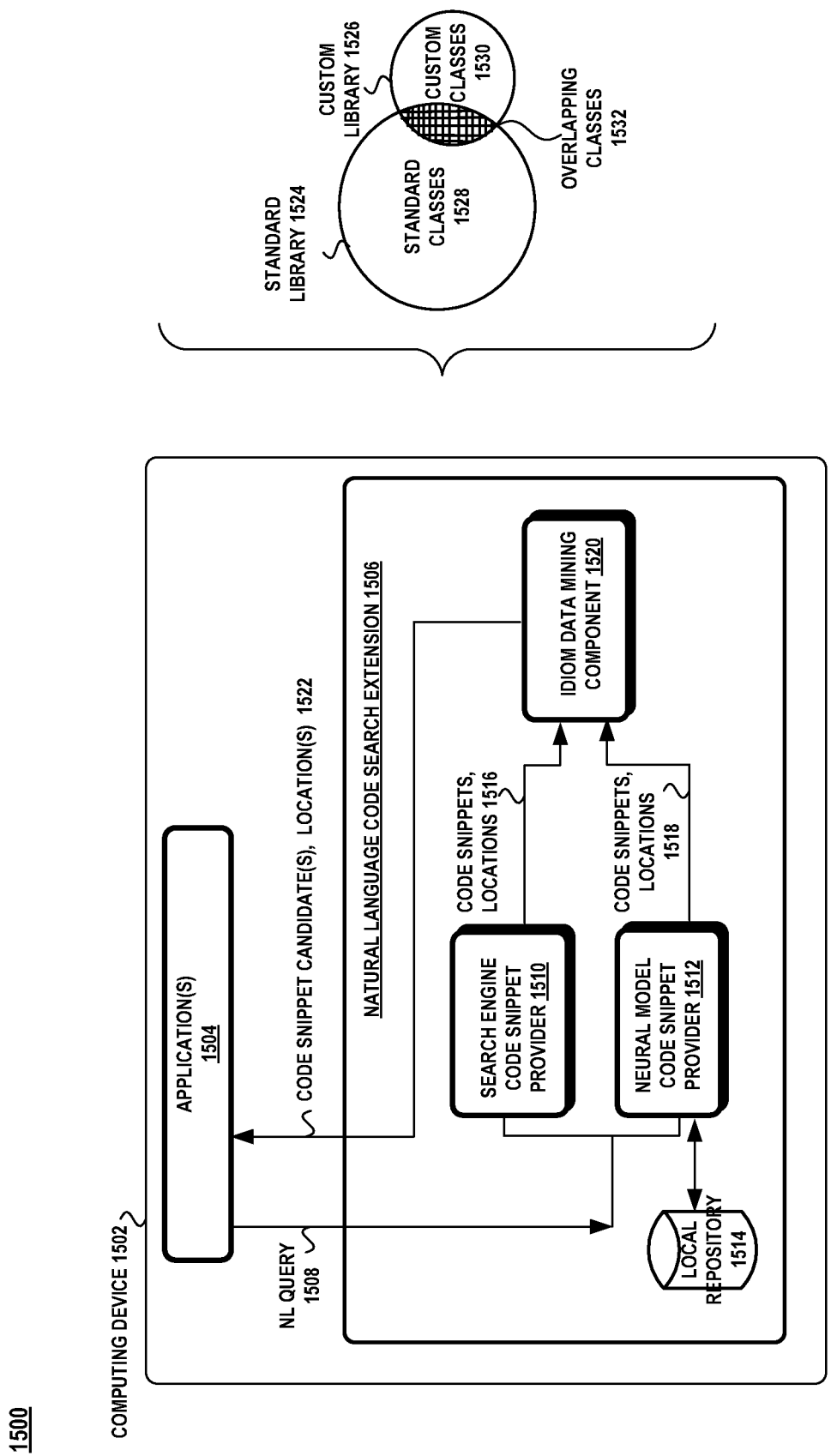
FIG. 15 is an exemplary configuration of the natural language code search extension.

Turning to FIG. 15, there is shown a configuration of a natural language code search system 1500 embodied in a computing device 1502. The computing device 1502 includes one or more applications 1504, such as a source code editor, integrated development environment, web browser, code development tool, and the like. An application 1504 is coupled to a natural language code search extension 1506 that extends the capabilities of the application 1504 to include a natural language code search. The extension may be implemented as an add-on, plug-in, extension API, etc. The natural language code extension 1506 includes the search engine code snippet provider 1510, the neural model code snippet provider 1512 and the idiom mining component 1520.

In this configuration, the natural language code extension 1506 receives natural language queries 1508 from an application 1504 and the queries 1508 are processed locally on the computing device 1502. The queries 1508 pertain to source code having types and methods from custom classes that are private. The custom classes may utilize types and methods of classes of a standard library. A standard library 1524 is a repository that contains commonly-used classes which may come from an open source repository and/or a programming language library. A custom library 1526 is a private repository that contains custom classes 1530. An overlapping class 1532 is a class from a standard library 1524 that is used in a custom class 1530. Thus, a natural language query may pertain to source code having custom classes 1530 from a custom library 1526 and overlapping classes 1532 that come from a standard library 1524.

The search engine code snippet provider 1510 and the neural model code snippet provider 1512 operate as described above with the following exceptions. Referring to FIGS. 2 and 15, the search engine code snippet provider 1510 is configured with a search engine code snippet dataset that contains code snippets and URLs for the overlapping classes. The code snippets and URL 224 generated by the search engine code snippet provider 1510 pertain to code snippets containing types and method invocations from the overlapping classes.

Referring to FIGS. 3 and 15, the neural model training phase 302 of the neural model code snippet provider 1512, extracts source code programs from a local repository 1514 containing the custom classes and a source code repository containing the overlapping classes. The word embedding database 316 and the document embedding database 322 contain embeddings based on the custom classes and the overlapping classes. The neural model inference phase 304 outputs code snippets and URLs 338 pertaining to the custom classes and the overlapping classes.

Referring to FIGS. 4 and 15, the idiom miner 406 of configuration phase 402 of the idiom data mining component 1520 mines methods from source code programs containing the custom classes and the overlapping classes to generate closed and maximal frequent subtrees that are stored in the idiom cache storage 410. During the runtime phase 404 of the idiom data mining component 1520, the code snippet candidates and URLs are based on the idioms mined from the source code programs containing the custom and overlapping classes.

Exemplary Operating Environment

Figure 14:
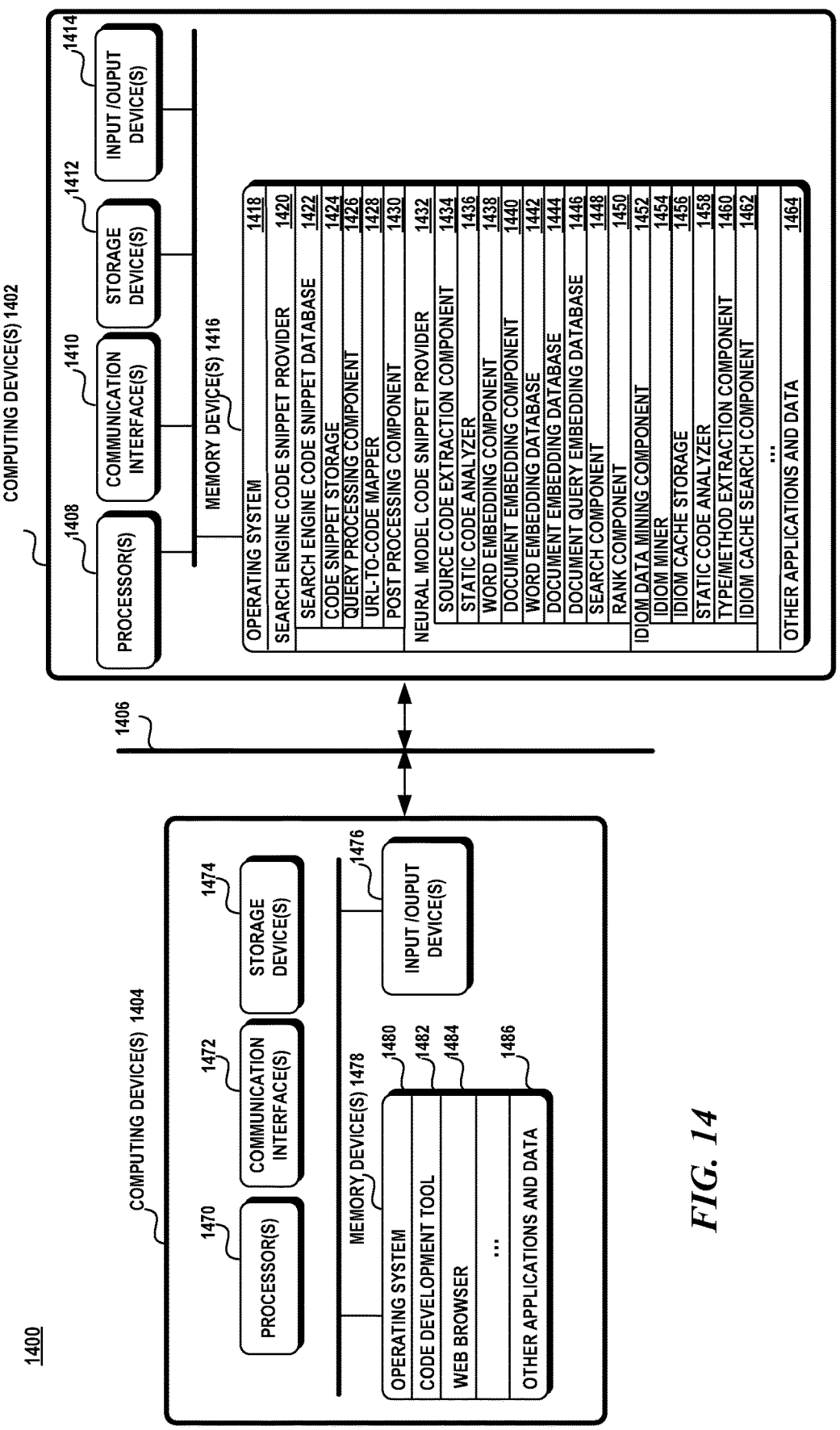
FIG. 14 is a block diagram illustrating an exemplary operating environment.

Attention now turns to a discussion of an exemplary operating environment. FIG. 14 illustrates an exemplary operating environment 1400. Turning to FIG. 14, the exemplary operating environment 1400 includes one or more computing devices 1402 of the natural language code search service and one or more computing devices 1404 of users that consume the services of the natural language code search service. The computing devices 1402, 1404 communicate through network 1406. However, it should be noted that the aspects disclosed herein is not constrained to any particular configuration of devices and that other configurations are possible. For example, an operating environment may be configured to operate on a single computing device having the natural language code search components and the application that uses the natural language code search feature.

A computing device 1402, 1404 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 1400 may be configured in a network environment, a distributed environment, a multi-processor environment, or a stand-alone computing device having access to remote or local storage devices.

A computing device 1402, 1404 may include one or more processors 1408, 1470, one or more communication interfaces 1410, 1472, one or more storage devices 1412, 1474, one or more input/output devices 1414, 1476 and one or more memory devices 1416, 1478. A processor 1408, 1470 may be any commercially available or customized processor and may include dual microprocessors and multi-processor architectures. A communication interface 1410, 1472 facilitates wired or wireless communications between the computing devices and other devices.

A storage device 1412, 1474 may be computer-readable medium that does not contain propagating signals, such as modulated data signals transmitted through a carrier wave.

Examples of a storage device may include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices in a computing device. The input/output devices 1414, 1476 may include a keyboard, mouse, pen, voice input device, touch input device, display, speakers, printers, etc., and any combination thereof.

A memory device 1416, 1478 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device may also include one or more external storage devices or remotely located storage devices that do not pertain to propagated signals, such as modulated data signals transmitted through a carrier wave.

Memory device 1416 may include an operating system 1418, a search engine code snippet provider 1420, a neural model code snippet provider 1432, an idiom data mining component 1452, and other applications and data 1464. The search engine code snippet provider 1420 includes search engine code snippet database 1422, code snippet storage 1424, query processing component 1426, an URL-to-code mapper 1428, and a post processing component 1430. The neural model code snippet provider 1432 includes a source code extraction component 1434, a static code analyzer 1436, a word embedding component 1438, a document embedding component 1440, a word embedding database 1442, a document embedding database 1444, a document query embedding 1446, a search component 1448, and a rank component 1450. The idiom data mining component 1452 includes an idiom miner 1454, an idiom cache storage 1456, a static code analyzer 1458, a type/method extraction component 1460, and an idiom cache search component 1462.

Memory device 1448 may include an operating system 1480, a code development tool 1482, a web browser 1484 and other applications and data 1486.

Network 1406 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

Network 1406 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of detecting idioms from methods/APIs that can be reused in other method/APIs having a similar type usage and similar method/API invocation usage. The technical features associated with addressing this problem involves mining a large corpus of source code programs for closed and maximal frequent subtrees that represent the largest and frequently-used source code idioms. The mined datasets include code snippets found through web searches and code snippets extracted from source code repositories with the combination representing a more robust dataset from which the idioms are detected. The idioms are provided by a web service that accepts search queries in a natural language from within any application capable of interacting with the web service.

CONCLUSION

A system is disclosed having one or more processors coupled to a memory. The one or more processors are configured to: generate a plurality of idioms from application of frequent subtree mining to a plurality of source code programs, an idiom representing a frequently-occurring pattern, an idiom associated with a type and/or method invocation; receive a query for a code snippet candidate; extract type data and method invocation data from a plurality of source code snippets that relate to the query; use the extracted type data and the extracted method invocation data to find one or more idioms matching the extracted type data and/or extracted method invocation data; and return one or more code snippet candidates generated from the found one or more idioms.

In one aspect, the frequent subtree mining is applied to source code programs from a source code repository. In another aspect, the one or more processors are further configured to: obtain a first plurality of code snippets matching the query from a web search; and extract type data and method invocation data from each code snippet of the first plurality of code snippets. In other aspects, the one or more processors are further configured to: obtain a second plurality of code snippets matching the query from a neural network model trained on a training dataset from a source code repository. In yet another aspect, the neural network model infers a code snippet matching the query from embeddings representing methods. In one or more embodiments, the data mining technique generates closed and maximal frequent subtrees that represent an idiom. In further aspects, the one or more processors are further configured to: prioritize each type of the type data; and rank the one or more code snippet candidates based on the prioritized type associated with a code snippet candidate. The query is in a natural language.

A method is disclosed comprising: obtaining, on a computing device having a processor and a memory, a plurality of code snippets matching a query for a source code fragment from a first source and a second source, the first source differs from the second source; extracting type data and method invocation data from the plurality of code snippets; finding one or more idioms that match the extracted type data and/or method invocation data, an idiom representing a frequently-occurring source pattern generated from application of a data mining technique to a plurality of methods of a source code repository; and providing the one or more idioms for use in code development.

In one aspect, first source includes websites that host the code snippets and the second source generates code snippets from a neural network model trained on source code from a source code repository. In another aspect, the method further comprises: training a neural network model to generate document embeddings of a method from a source code repository; and using the neural network model to generate code snippets having a similar document embedding as the query. In an aspect, the type data is an object-oriented class. In other aspects, the method further comprises pairing an idiom with a location of a source code snippet from which the idiom was sourced. In another aspect, the method further comprises associating a priority to each type; and ranking the one or more plurality of idioms based on the priority associated with a respective type.

A device is disclosed comprising: one or more processors coupled to a memory; and one or more programs. The one or more programs are stored in the memory and are configured to be executed by the one or more processors. The one or more programs including instructions that: generate a plurality of idioms from application of a data mining technique to a plurality of methods from source code programs, an idiom representing a frequently-occurring source code pattern, an idiom associated with a type and a method; find code snippets from a first source and a second source that satisfy a query for at least one code snippet candidate; obtain type data and method data from the code snippets; find one or more idioms having similar type data and method data as the obtained type data and method data; and return the at least one code snippet candidate formed from the one or more idioms.

In one aspect, the code snippets from the first source contain overlapping classes, and the code snippets from the second source contain custom classes. In one aspect, the query is received from a code development tool. In another aspect, the one or more programs including instructions that: associate a location with the at least one code snippet candidate; and provide the at least one code snippet candidate with the location. In one or more aspect, the type data is an object-oriented class.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system of enhanced searching for reusable source code, comprising:
    one or more processors coupled to a memory; and
    one or more programs, wherein the one or more programs are stored in the memory and configured to be executed by the one or more processors, the one or more programs including instructions to perform actions that:
        receive a natural language query for an idiom;
        obtain a first plurality of source code snippets corresponding to the natural language query from an Internet search engine
        generate embedding of words of the natural language query from a neural model;
        obtain a second plurality of source code snippets corresponding to the natural language query from a document database, wherein each of the second plurality of source code snippets is obtained from the embedding of words of the natural language query closely matching a document embedding of words of each of the second plurality of source code snippets, wherein the document embedding is generated from a neural model;
        extract types and method usage from each of the first plurality of source code snippets and each of the second plurality of source code snippets;
        access an idiom storage having a plurality of idioms, an idiom representing a frequently-occurring source code pattern based on closed and maximal frequent subtrees;
        search the idiom storage for idioms having similar type and/or method usage of the first plurality of source code snippets and the second plurality of source code snippets;
        rank the idioms found in the idiom storage based on precision of matching the type and method usage of the first plurality of source code snippets and the second plurality of source code snippets; and
        return top-ranked idioms as the reusable source code.

2. The system of claim 1, wherein the natural language query is received through an application programming interface (API).

3. The system of claim 1, wherein the document database includes a plurality of source code snippets, each of the plurality of source code snippets indexed by a document embedding.

4. The system of claim 1, wherein the one or more programs include further instructions to perform actions that:
    extract a list of keywords from the natural language query;
    generate a word embedding for each keyword;
    convert the word embeddings for each of the keywords into a document embedding; and
    utilize the document embedding to search for matching source code snippets from the document database.

5. The system of claim 4, wherein the word embeddings are obtained from a pre-configured word embedding database.

6. The system of claim 5, wherein the word embeddings of the pre-configured word embedding database are generated from a neural network trained from source code programs.

7. The system of claim 1, the one or more programs include further instructions to perform actions that:
    perform a web search to find websites associated with keywords of the natural language query; and
    search a code snippet storage using a uniform resource locator (URL) of the found websites for the first plurality of source code snippets.

8. The system of claim 1, wherein the code snippet storage is pre-configured with source code snippets and corresponding URLs.

9. A computer-implemented method of enhanced searching of reusable source code, comprising:

generating a search engine code snippet storage including a first plurality of source code snippets, each of the first plurality of source code snippets associated with a web location;

generating a document database including a second plurality of source code snippets, wherein the document database is indexed by a document embedding, wherein the document embedding is based on word embeddings of select words of a respective source code snippet, wherein the word embeddings are generated by a neural model;

generating an idiom storage containing idioms, wherein an idiom represents reusable source code as a frequently-occurring source code pattern based on closed and maximal subtrees;

generating word embeddings of the natural language query from the neural model;

obtaining a third plurality of source code snippets that correspond to a natural language query from the search engine code snippet storage and word embeddings of the natural language query corresponding to document embeddings of the document database;

searching for idioms from the idiom storage having similar type usage and/or method usage as the third plurality of source code snippets; and ranking the found idioms based on closest matching type usage and method usage of the third plurality of source code snippets.

10. The computer-implemented method of claim 9, wherein generating a search engine code snippet storage further comprises:

mining source code snippets from web searches; and storing the mined source code snippets with a location of each of the mined source code snippets in the search engine code snippet storage.

11. The computer-implemented method of claim 9, wherein generating a document database further comprises:

training a neural network model on a plurality of source code programs to generate a word embedding for each source code token in each of the plurality of source code programs.

12. The computer-implemented method of claim 11, further comprising:

generating a document embedding for each of the source code programs from the word embeddings of the tokens in a source code program.

13. The computer-implemented method of claim 12, wherein the document embedding for each of the source code programs is a weighted average of all unique tokens in the source code programs.

14. The computer-implemented method of claim 9, wherein the idioms are indexed by a unique identifier composed of types and methods of the frequently-occurring source code pattern.

15. The computer-implemented method of claim 14, wherein facilitating a search for idioms from the idiom storage further comprises:

extracting types and methods from each of the third plurality of source code snippets; and searching for the types and methods from each of the third plurality of source code snippets from the idiom storage.

16. The computer-implemented method of claim 9, wherein generating an idiom storage further comprises:

mining a source code repository for closed and maximal frequent subtrees, wherein a closed and maximal frequent subtree represents an idiom.

17. The computer-implemented method of claim 9, further comprising:

receiving the natural language query through a network from a source code development tool.

18. The computer-implemented method of claim 17, further comprising:

accessing the second database using word embeddings derived from tokens from custom classes and overlapping classes.

19. A computer-implemented method of enhanced searching of reusable source code, comprising:

obtaining a natural language query for an idiom representing reusable source code as a source code pattern having a custom class and an overlapping class;

retrieving a first source code snippet corresponding to the natural language query from a first database of source code snippets, wherein the first database includes source code snippets having at least one overlapping class and without a custom class;

generating embeddings of words of the natural language query from a neural model;

retrieving a second source code snippet corresponding to the embeddings of the words of the natural language query from a second database of source code snippets, the second data including source code snippets having at least one custom class and at least one overlapping class;

extracting types and method usage from the first source code snippet and the second source code snippet;

searching an idiom storage having a plurality of idioms for idioms having similar types and/or method usage as the first source code snippet and the second source code snippet, wherein the idiom is based on closed and maximal subtrees; and ranking the idioms of the idiom storage found to have similar types and/or method usage based on closest matching types and method usage as the first source code snippet and the second source code snippet.

20. The computer-implemented method of claim 19, wherein the plurality of idioms is mined from source code programs having custom and overlapping classes.

* * * * *